United States Patent [19]
Gerhold

[11] 3,854,300
[45] Dec. 17, 1974

[54] WATER VAPOR REMOVAL FROM VENT GAS SYSTEMS

[75] Inventor: Clarence G. Gerhold, Palatine, Ill.

[73] Assignee: Universal Oil Products Company, Des Plaines, Ill.

[22] Filed: June 8, 1973

[21] Appl. No.: 368,419

[52] U.S. Cl............................ 62/88, 62/402, 62/93, 62/85
[51] Int. Cl............................................... F25b 9/00
[58] Field of Search............. 62/85, 86, 87, 88, 402, 62/172, 93

[56] References Cited
UNITED STATES PATENTS

| | | | |
|---|---|---|---|
| 1,850,610 | 3/1932 | Whitaker | 62/93 |
| 2,175,162 | 10/1939 | Waterfill | 62/87 |
| 2,316,744 | 4/1943 | Mellett | 62/88 |
| 2,664,001 | 12/1953 | Brisken | 62/402 |
| 2,730,874 | 1/1956 | Schelp | 62/88 |
| 2,966,402 | 12/1960 | Hosche | 62/93 X |
| 3,226,948 | 1/1966 | Alderson | 62/93 |

Primary Examiner—William J. Wye
Attorney, Agent, or Firm—James R. Hoatson, Jr.; Philip T. Liggett; William H. Page, II

[57] ABSTRACT

In the venting of waste gases, particularly where there has been wet scrubbing of the vent gases, there can be a high moisture content which will cause an objectionable visible plume of water vapor that observers might incorrectly interpret to be an air polluting material and the present improved system embodies a moisture eliminating procedure which first runs the gas stream through expansion means to lower the stream pressure and effect sufficient cooling that will permit liquid $H_2O$ to be separated out of the stream. The cooled gas stream, with reduced water content, is then compressed to ambient pressure conditions and to a higher temperature such that that may be venting to the atmosphere with little or no plume. Preferably, turboexpander means is used to provide at least a part of the energy for recompressing the stream prior to its discharge to the atmosphere.

2 Claims, 2 Drawing Figures

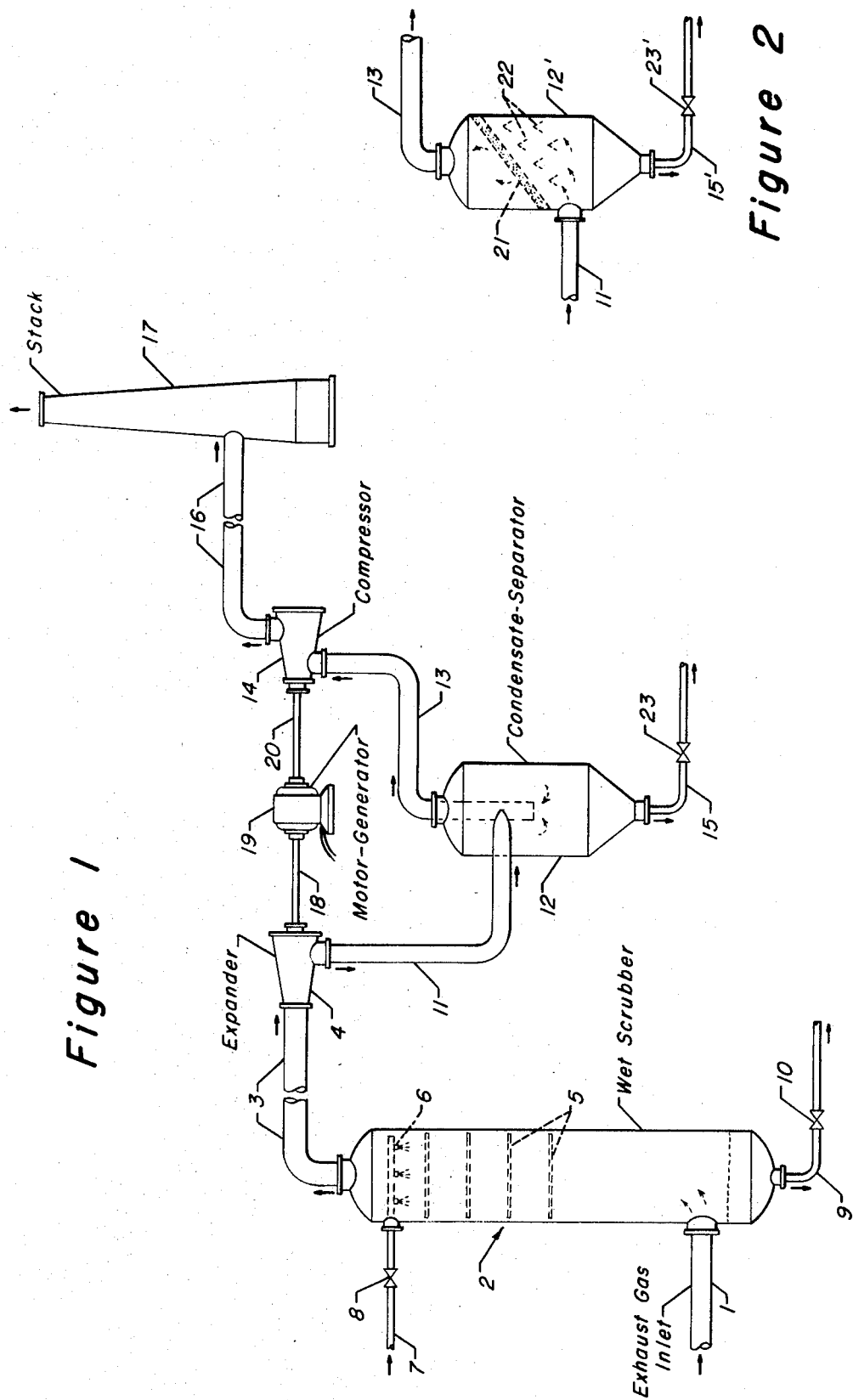

WATER VAPOR REMOVAL FROM VENT GAS SYSTEMS

The present invention relates to a system for effecting the removal of water vapor from vent gases in order to minimize a condensate plume from a vent stack.

More particularly, this invention is directed to providing a water removal system which incorporates turboexpander means to provide the dual functions of: (1) cooling the gas stream for the conversion of water vapor to water condensate, and (2) providing energy which can be transferred to compressor means for, in turn, compressing and heating the cooled and expanded stream prior to its being sent to the vent stack.

At the present time, many types of gaseous streams are being subjected to water containing scrubbing procedures so as to remove particulates and/or undesirable gases and fumes. For example, scrubbing operations are commonly used in connection with vent gas streams from power plants, various types of chemical plants, foundries, smelters, and the like. The resulting water vapor in the scrubbed gas stream can then cause a plume from the vent such that stack observers might incorrectly believe that an objectionable fume or air polluting material is being discharged to the atmosphere.

In order to prevent a water vapor plume, there has been the practice of heating or reheating the exhaust gas stream to, in effect, remove the inevitable water condensation to areas or zones which will be at some distance from the stack. However, this heating procedure necessarily involves the use of a burner-heater means and its operation can become fairly expensive from the fuel requirement aspects.

It is thus a principal object of the present invention to provide a water vapor removal system for vent gas streams which eliminates the need of fuel burning-heater means.

It is a further object of the present invention to provide for the use of turboexpander means to accommodate the vapor containing gas stream and effect a pressure reduction of such stream so that resulting cooling will permit the removal of liquid water from the system.

As still another object of the system, there can be energy recovery from the turbine-type expansion means and such energy is utilized direct connection means to recompress the cooled gas stream up to ambient pressure conditions.

In a broad aspect, the present invention embodies a method for removing excessive water vapor from a scrubbed gas stream in order to minimize visible plume from a stack, which comprises, passing the moisture containing gas stream through expansion means to a lower pressure zone to effect cooling and resulting water vapor condensation, collecting and removing resulting water condensate from such zone, passing the cooled gas stream with retained latent heat of vaporization to a compression zone and therein effecting a recompression and heating of said stream, and then effecting a discharge of the resulting stream with a lowered moisture content.

In a more specific aspect, the present improved system will make use of a turbine type of expander to effect the expansion of the gas stream and the lowering of temperature to accomplish the desired condensation of water, whereby liquid water may be removed from the system prior to a subsequent gas stream compression and a higher temperature discharge. Turbo types of expanders are available commercially and may be used to particular advantage in this type of operation. It is also desirable to provide for a direct connection between the turboexpander means and the compressor means such that the energy gained from the turboexpander may be utilized to effect the compression and reheating of the dried gas stream. Also, as will be pointed out more fully hereinafter in connection with the drawing, there can be used a motor-generator means between the expander and the compressor means so as to make provision for additional power input into the system and obtain the desired compression of the gas stream carrying to the stack.

Various types of water collection and removal means may be incorporated into the system and it is not intended to limit the present invention to any one type of apparatus. One type of condensate separator may comprise a centrifugal form of water collection and separator means. Still another type of water removal means may comprise filtering or mist extracting types of equipment within a suitable separating chamber. In still other instances, there may be suitable baffle means and impingement plates which will enhance the collection of water condensate for removal from the system.

It may also be pointed out that the present system is of particular advantage in connection with waste gas streams which may have small subdivided particles entrained therewith which, in turn, can act as nucleating points for water condensation. In other words, finely divided entrained particulates when carrying through the expansion means into a water condensation and collection zone will provide for the enhancement of water condensation, with a water droplet tending to condense and form around each entrained particle. Thus, the present system automatically tends to enhance water condensation as well as remove small entrained particles from the gaseous stream at the water collection zone following the expander means.

Reference to the accompanying drawing and the following description thereof will serve to illustrate one embodiment of the present system as well as permit further explanation and description of the advantages of the system for removing water vapor from an exhaust gas stream.

FIG. 1 of the drawing shows diagrammatically a water removal system for treating a scrubbed gaseous stream which embodies expansion, water separation and compression means ahead of the vent stack.

FIG. 2 of the drawing illustrates diagrammatically a modified form of condensate collection zone which utilizes baffle and filtering means to remove water condensate from the expanded-cooled gas stream.

Referring now particularly to FIG. 1 of the drawing, there is indicated the introduction of a waste gas stream by way of inlet 1 into a wet scrubber 2 and a discharge of the subsequently scrubbed gas stream by way of conduit 3 into turboexpander means 4. The scrubber 2 is being illustrated diagrammatically to show the countercurrent upward flow of the gas stream through contact plates 5 and through a descending rain and spray of scrubbing liquid that originates from nozzles 6 in turn receiving water or other scrubbing liquid by way of line 7 and valve means 8. The wash water, or other liquid, together with any entrapped particulates, is removed from the lower end of the chamber 2 by way of line 9 having control valve means 10. Where desired, at least a portion of the liquid from line 9 may be recycled to line 7 for reuse in the washing liquid while a portion of the removed liquid with collected particulates may be removed from the system.

In accordance with the present invention, the wet gas stream from line 3 carries through expander means 4 so as to effect a reduction of pressure and a sharp cooling of the gaseous stream to a level which will provide for the formation of water condensate. In the present drawing, the cooled, expanded stream from means 4 carries by way of conduit 11 into a condensate-separator zone 12 and thence into transfer conduit 13 for introduction into compressor means 14. Condensed water, along with any other liquid condensates, is removed from the system by way of line 15 and control valve 23 such that a waste gas stream, at least partially dried, will be transferred by way of conduit 13 into the compressor means 14. Such stream will also carry with it the latent heat of vaporization such that the gas stream following compressor means 14 will be at a substantially higher temperature to carry by way of conduit 16 into stack means 17 and reach the atmosphere with little or no plume. With the gas stream having suitable temperature reduction through expander means 4, water removal within separator means 12, and a resulting relatively high sensible heat at ambient pressure conditions carrying into the stack 17, there can readily be a discharge of the waste gas stream providing substantially no visible plume from the stack means 17.

In accordance with a preferred operational system for the present invention, it should be noted that the turboexpander means 4 connects through shaft means 18 to a motor-generator means 19 and that the latter connects with shaft means 20 and to the compressor means 14. Thus, the motor-generator 19 can make use of the energy developed by the turboexpander 4 while at the same time providing for additional introduction of electrical energy into the compressor means 14 such that the gas stream may be discharged at about ambient pressure to the stack means 17. The expander means 4 may be of an axial flow type or of other suitable turbine design such that power generated thereby may be transferred directly into motor-generator means 19. Also, the compressor 14 will preferably be of the turbine or rotodynamic type, rather than of reciprocating type, in order to make use of the axial, direct-drive transfer of energy from expander 4 into motor-generator 19.

The present system need not be limited to any one pressure level inasmuch as the exhaust gas stream entering scrubber means 12 and turboexpander means 4 may be at a superatmospheric pressure level of the order of 10 to 15 pounds per square inch gauge, or more, or alternatively the pressure level may be merely a few inches of water pressure such as stack gases from power plants or other many types of low pressure vent streams. In any event, the expander means 4 shall be operated in a manner to reduce pressure sufficiently to, in turn, provide a desired reduced temperature level to effect condensation of at least a substantial portion of the entrained water vapor and permit its removal at the condensate-separator means. The amount of pressure reduction to effect a desired lower temperature level will vary with different types of exhaust gas streams, their pressure level, and with the amount of water vapor that may be entrained therewith. There is no one predetermined set of conditions for an operation under the present system which will be suitable for all types of exhaust gas stream. The compressor means shall, of course, operate in a manner to recompress the exhaust gas stream to a level sufficient to effect the desired discharge of the gas stream through conduit means such as 16 and out the vent stack means such as 17. Typically, the pressure level will be about equivalent to ambient conditions. Generally, and from practical aspects, the present operation need only operate at water removal conditions which will insure the substantial removal of all of the water vapor plume exiting from the vent stack 17 so as not to expend excessive energy in accomplishing the removal of all water vapor from the stream. Actually, the reheating of the gas stream through the compressor stage will convert the latent heat of vaporization into sensible heat and, in turn, will take care of precluding water condensation close to the outlet of the vent stack.

It may be noted in FIG. 1 of the drawing that the condensate-separator 12 is indicated as having a centrifugal separator type of operation whereby water condensate may be collected around the walls of the separator means and then flow downwardly to the lower portion of the chamber for discharge by way of line 15 and valve 23. However, in connection with FIG. 2 of the drawing which shows an alternative form of construction, it will be noted that the condensate-separator chamber 12' receiving the lower pressure, cooled stream from conduit 11 makes use of mist extractor or filter means 21 across the inside cross-sectional area thereof such that entrained water droplets can be removed as liquid water from the lower end of the chamber 12' by way of line 15' and valve 23'. There are also indicated diagrammatically the positioning of a plurality of impingement plates or baffle means 22 across the interior portion of chamber 12'. Such types of plates and/or one or more stages of filtering means can provide for the removal of water condensate from the chamber and permit the discharge of a substantially dry gaseous stream by way of transfer conduit 13.

In order to further illustrate the present invention for effecting water removal and the elimination of a plume from the venting of a highly saturated scrubbed gas stream, as for example, air at 100° F. and one atmosphere gage pressure, containing 6.0 mole per cent water (which is about 90 percent saturated) is subjected to expansion and pressure reduction to the order of one-half atmosphere gage.

In accordance with thermodynamic principals, a temperature reduction is achieved with the expansion step to provide resulting water mist or condensate in the gas stream at about 75° F. The stream is then subjected to flow through a cyclone type separator and about 18 to 20 percent of the entrained water content is removed.

Following the water removal step, the air stream with its latent heat of vaporization is passed to a compressor and then recompressed back to about one atmosphere of gage pressure with this compression step providing a resulting temperature increase for the air stream to about 124° F. This hot, drier air stream is then discharged through a vent or stack means to ambient, outdoor conditions and no visible steam plume is produced.

As heretofore noted, it is not intended to limit the system of the present invention to any one type of water separator means; however, it is desirable and necessary to have relatively high efficiency of water removal such that mist will not be carried along and effect a rehumidification of the air stream during the succeeding compression and heating step.

I claim as my invention:

1. In the scrubbing of waste gases with aqueous liquid to remove pollutants therefrom, thereby forming a scrubbed gas stream of high moisture content such that an objectionable visible plume of water vapor is formed upon discharge of the gas stream to the atmosphere through a stack, the method of minimizing said visible plume from the stack which comprises expanding said scrubbed gas stream of high moisture content to a lower pressure such as to effect cooling and resulting water vapor condensation, separating resulting water condensate from the gas stream, recompressing the cooled gas stream with retained latent heat of vaporization and thereby further heating said stream, and then discharging the resulting heated stream with the lowered moisture content through said stack to the atmosphere.

2. A method of claim 1 further characterized in that said moisture containing gas stream is expanded in a turbine type expansion means providing power therefrom and such power is utilized in the recompression of the gas stream.

* * * * *